(12) United States Patent
Bellonch Orenes et al.

(10) Patent No.: US 12,163,512 B2
(45) Date of Patent: Dec. 10, 2024

(54) METHOD FOR CALIBRATING A PERISTALTIC PUMP, METHOD FOR DISPENSING A QUANTITY OF LIQUID BY MEANS OF A PERISTALTIC PUMP AND DEVICE FOR PRODUCING STERILE PREPARATIONS THAT CAN EXECUTE SAID METHODS

(71) Applicant: GRIFOLS, S.A., Barcelona (ES)

(72) Inventors: Carles Xavier Bellonch Orenes, Barcelona (ES); David Rodriguez Jurado, Barcelona (ES); Ceferino Ruz Torres, Barcelona (ES); Ignacio Blazquez Garcia-Valenzuela, Barcelona (ES); Xavier Fernandez Perez, Barcelona (ES)

(73) Assignee: GRIFOLS, S.A., Barcelona (ES)

( * ) Notice: Subject to any disclaimer, the term of this patent is extended or adjusted under 35 U.S.C. 154(b) by 413 days.

(21) Appl. No.: 16/821,837

(22) Filed: Mar. 17, 2020

(65) Prior Publication Data

US 2020/0309110 A1 Oct. 1, 2020

(30) Foreign Application Priority Data

Mar. 26, 2019 (EP) .................................... 19382212

(51) Int. Cl.
*F04B 43/00* (2006.01)
*F04B 43/12* (2006.01)
(Continued)

(52) U.S. Cl.
CPC ...... *F04B 43/0081* (2013.01); *F04B 43/1253* (2013.01); *G01F 25/17* (2022.01); *F05B 2270/802* (2013.01)

(58) Field of Classification Search
CPC .......... F04B 13/00; F04B 13/02; F04B 23/04; F04B 23/14; F04B 43/0081; F04B 43/009; F04B 43/12; F04B 43/1253; F04B 49/065; F04B 51/00; F04B 53/00; F05B 2270/802; G01F 25/17
See application file for complete search history.

(56) References Cited

U.S. PATENT DOCUMENTS 4,073,304 A * 2/1978 Lerner .................... G01F 25/17
137/101.21
4,468,219 A 8/1984 George et al.
(Continued)

FOREIGN PATENT DOCUMENTS

CN 101403762 A 4/2009
CN 101504420 A 8/2009
(Continued)

OTHER PUBLICATIONS

Search Report for European Patent Application No. 19382212, mailed Jun. 25, 2019.
(Continued)

*Primary Examiner* — Dominick L Plakkoottam
*Assistant Examiner* — Charles W Nichols
(74) *Attorney, Agent, or Firm* — Merchant & Gould P.C.

(57) ABSTRACT

A method is for calibrating a peristaltic pump, and for dispensing a quantity of liquid by a peristaltic pump. A device for producing sterile preparations can execute the methods.

25 Claims, 8 Drawing Sheets

(51) Int. Cl.
*G01F 25/00* (2022.01)
*G01F 25/17* (2022.01)

(56) References Cited

U.S. PATENT DOCUMENTS

| | | | |
|---|---|---|---|
| 4,715,786 A | 12/1987 | Wolff et al. | |
| 4,910,682 A | 3/1990 | Wolff et al. | |
| 4,925,096 A * | 5/1990 | Gill | G01F 25/0092 239/10 |
| 5,098,261 A | 3/1992 | Bertoncini | |
| 5,388,972 A | 2/1995 | Calhoun et al. | |
| 5,616,305 A * | 4/1997 | Mathieu | A61M 1/1656 422/267 |
| 5,947,692 A | 9/1999 | Sahlin et al. | |
| 6,167,724 B1 * | 1/2001 | Pozivil | F04D 1/10 62/653 |
| 6,691,047 B1 | 2/2004 | Fredericks | |
| 2004/0104242 A1 * | 6/2004 | Scordato | G01F 25/17 222/1 |
| 2004/0142636 A1 | 7/2004 | Melcer | |
| 2004/0241634 A1 | 12/2004 | Millis et al. | |
| 2005/0074337 A1 | 4/2005 | Anderson et al. | |
| 2007/0196213 A1 * | 8/2007 | Parsons | F04B 49/065 417/42 |
| 2008/0053209 A1 | 3/2008 | Gugaratshan et al. | |
| 2008/0166292 A1 * | 7/2008 | Levin | A61M 5/1723 600/431 |
| 2010/0135824 A1 | 6/2010 | Ickinger et al. | |
| 2010/0282862 A1 | 11/2010 | Gilpatrick | |
| 2012/0222774 A1 | 9/2012 | Husnu et al. | |
| 2014/0086771 A1 | 3/2014 | Bassani | |
| 2014/0248159 A1 | 9/2014 | Marsh et al. | |
| 2015/0240802 A1 | 8/2015 | Guthrie et al. | |
| 2016/0166755 A1 | 6/2016 | Golarits et al. | |
| 2017/0100025 A1 | 4/2017 | Lengsfeld | |
| 2017/0259225 A1 | 9/2017 | Ratigan et al. | |
| 2017/0266377 A1 * | 9/2017 | Peterfreund | A61M 5/14232 |
| 2017/0296727 A1 * | 10/2017 | Burbank | A61M 1/165 |

FOREIGN PATENT DOCUMENTS

| | | |
|---|---|---|
| CN | 203447572 U | 2/2014 |
| CN | 105257518 A | 1/2016 |
| CN | 106168209 A | 11/2016 |
| CN | 206495771 U | 9/2017 |
| CN | 207297300 U | 5/2018 |
| CN | 109404265 A | 3/2019 |
| CO | 2018/0008436 A1 | 8/2018 |
| EP | 0154681 A1 | 9/1985 |
| EP | 0323205 A1 | 7/1989 |
| EP | 0624359 A1 | 11/1994 |
| EP | 1236644 A1 | 9/2002 |
| EP | 2581486 A2 | 4/2013 |
| ES | 1019546 U | 4/1992 |
| FR | 2405471 A1 | 5/1979 |
| GB | 1493106 A | 11/1977 |
| JP | 3615762 B2 | 2/2005 |
| NC | 2018/0008436 A1 | 8/2018 |
| SU | 1321914 A1 | 7/1987 |
| WO | 99/58178 A1 | 11/1999 |
| WO | 2006/021872 A2 | 3/2006 |
| WO | WO-2017160904 A1 * | 9/2017 |
| WO | 201878059 A1 | 5/2018 |

OTHER PUBLICATIONS

Office Action for Columbian Patent Application NC2020/0002867 (Aug. 24, 2022).

* cited by examiner

METHOD FOR CALIBRATING A PERISTALTIC PUMP, METHOD FOR DISPENSING A QUANTITY OF LIQUID BY MEANS OF A PERISTALTIC PUMP AND DEVICE FOR PRODUCING STERILE PREPARATIONS THAT CAN EXECUTE SAID METHODS

CROSS-REFERENCE TO RELATED APPLICATION

This application claims benefit of priority to European Patent Application No. 19382212.9, filed Mar. 26, 2019, which application is incorporated herein by reference.

BACKGROUND OF THE INVENTION

The present invention relates to the calibration and operation of a peristaltic pump, preferably in the field of producing sterile preparations. Specifically, the present invention relates to a method for calibrating a peristaltic pump and to a method for dispensing a determined quantity of liquid by means of a peristaltic pump. The present invention also relates to a device for producing sterile preparations comprising a peristaltic pump which can be calibrated and can dispense by means of the aforementioned methods.

SUMMARY OF THE INVENTION

A peristaltic pump is a type of positive-displacement pump used to pump a wide variety of fluids and popularly known as a roller pump. In peristaltic pumps the fluid usually circulates inside a flexible tube or pipe housed in a casing or cover. Said casing or cover is generally circular or semi-circular, although it can also have other shapes such as, for example, linear. Peristaltic pumps commonly comprise a rotor that normally comprises two or more rollers or the like. The flexible tube or pipe is generally housed between the casing and the rotor, the rollers of which compress said tube. The rotation of the rotor and its respective rollers produces what is known as peristalsis, thus causing the fluid contained in the flexible tube or pipe to move forward.

The fact that the fluid passes through the inside of the tube and does not come into contact with any pump components means that the use of this type of pump is especially advantageous for pumping sterile or harsh fluids, since this prevents the components of the pump from contaminating the sterile fluid or said components from being damaged by said harsh fluid (acids etc.). The result is that peristaltic pumps are especially used in sectors such as medical, pharmaceutics, food, chemical industry, etc.

One of the problems associated with peristaltic pumps is that the flexible tube or pipe through which the fluid to be pumped circulates is subject to high mechanical stress, which requires it to be replaced with a certain frequency. The wear that said flexible tube or pipe suffers due to the mechanical stress to which it is subjected makes it advisable to calibrate the pump during several phases of the useful life of the flexible tube or pipe, since its properties vary with time, i.e. a calibration carried out after replacing the flexible tube or pipe may not match reality when the flexible tube is at the end of its useful life or even halfway through it. In addition to wear, among other reasons, it may also be necessary to replace the tube to avoid cross-contamination when changing the fluid that circulates inside same. After replacing the tube, it is advisable or even necessary to carry out a new calibration of the pump. This is especially important in applications that require great accuracy and precision of the dose supplied.

The calibration of peristaltic pumps is usually carried out manually and commonly consists in determining the volume or mass flow rate of the pump at different speeds of the pump. For this purpose, the volume or mass of fluid pumped in a certain period of time is usually measured at different pump speeds. This type of calibration usually results in wasting part of the fluid to be pumped, which can cause significant economic losses, especially if the fluid is expensive. Especially in applications that require great accuracy and precision of the dose supplied, said calibration must be carried out each time the operating conditions of the pump change, i.e. each time the fluid to be pumped or the conditions thereof (temperature, viscosity, pressure, etc.) are changed, when replacing the flexible tube or pipe through which the fluid circulates, when the flexible tube or pipe has suffered wear due to the operating conditions of the pump, etc. Therefore, in certain applications, it may be necessary to perform a large number of calibrations, resulting in large amounts of time lost, and probably fluid wasted.

One problem associated with the methods for calibrating peristaltic pumps of the prior art is that the calibration conditions are usually different from the operating conditions of the pump. For example, when calibrating the pump, the fluid is dispensed into an open vessel such as a graduated cylinder, whereas during normal operation of the pump, the fluid is dispensed into a closed vessel such as a vial; therefore, under operating conditions, the operation of the pump may vary from what was expected, which means that the calibration is not as good as it should be.

PCT patent WO 2017/160904 A1 discloses a method for determining an error coefficient associated with a pump system. According to said method, a positive-displacement pump is used to pump a predetermined quantity of liquid into a vessel, and the time required to pump said predetermined quantity of liquid is measured. After measuring the quantity of liquid pumped, the operating flow rate of the pump is determined. Based on the difference between the theoretical flow rate of the pump and the measured flow rate, an error coefficient of the pump is calculated and stored in the pump control device.

One aim of the present invention is to provide a method for calibrating a peristaltic pump that makes it possible to exactly adjust the nominal volume per pumping cycle to the actual volume per pumping cycle throughout the operating range of the pump. In addition, said calibration method can be performed automatically or autonomously, i.e. without the need for any intervention from the user of the peristaltic pump. For this, the present invention discloses a method for calibrating a peristaltic pump in order to determine a calibrated volume per pumping cycle of said pump, said pump being associated with a hydraulic circuit, comprising the following steps:
 pumping a quantity of liquid from a source vessel into a calibration vessel by means of
 a number of pumping cycles of the peristaltic pump,
 measuring the amount of liquid pumped into the calibration vessel,
 and further comprising the step of determining the calibrated volume per pumping cycle of the peristaltic pump, said calibrated volume per pumping cycle being a function of the measured quantity of liquid, said number of pumping cycles and at least one correction coefficient previously stored in a memory of a control device of said pump.

Preferably, according to the present invention, said at least one correction coefficient can be obtained empirically and stored prior to the operation.

In cases in which the liquid has constant density, direct volume measurement can be used to indirectly obtain the mass of the liquid measured, or vice versa, i.e. after weighing the quantity of liquid in the calibration vessel, to indirectly determine the volume of the liquid contained therein.

The fact that the at least one correction coefficient is previously stored in a memory of a control device of the peristaltic pump allows the (re)calibration and operation conditions to be different, which in turn facilitates the reuse of the liquid used in the (re)calibration.

For this purpose, in an advantageous embodiment, the calibration vessel can be a variable-volume vessel with a plunger, such as a syringe. The preferred use of a variable-volume vessel with a plunger as a calibration vessel also has the advantage of facilitating the measurement of the volume contained therein.

Advantageously, said peristaltic pump comprises n compressors of the flexible tube or pipe, for example, rollers, and pumping cycle is understood to be 1/n of a full revolution of the rotor of the peristaltic pump, wherein n is an integer equal to or greater than 2. In other words, in a case where, for example, the rotor of the peristaltic pump has three rollers, the pumping cycle is ⅓ of a revolution of the peristaltic pump. Alternatively, the pumping cycle of the peristaltic pump can also be understood as a complete revolution of the rotor, among others.

Preferably, the number of pumping cycles is an integer. This is advantageously forced by programming the control device of the peristaltic pump. For example, in a case in which, for example, the rotor of the peristaltic pump has four rollers and the pumping cycle is considered to be ¼ of a full revolution of the rotor, the peristaltic pump advances by multiple quarter-turn integers, i.e. it cannot perform, for example, two and a half quarters of a turn. Continuing with the previous example, every quarter of a turn of the rotor, the pump supplies a determined quantity of liquid. However, continuing with the example, if the rotor only performs an eighth of a turn, i.e. half a pumping cycle, the quantity of liquid supplied can vary substantially from one repetition to another. In order to avoid this, as explained above, the pump control device is preferably configured so that the pump rotor only performs complete pumping cycles.

In a preferred embodiment, said at least one correction coefficient is determined by empirical tests and a corresponding statistical analysis thereof. Said empirical tests can be carried out under various possible operating conditions of the pump and/or the device associated with same so that the calibration of the pump is as precise and accurate as possible throughout the entire operating range of the pump, even if the operating conditions vary.

Preferably, said at least one correction coefficient comprises a coefficient for correcting the expansion of the hydraulic circuit during calibration.

Advantageously, said at least one correction coefficient comprises a coefficient for correcting the filling resistance of the calibration vessel, i.e. said correction coefficient takes into account the differences between filling, for example, a syringe and a bag. Said correction coefficient is especially important when the calibration vessel and the final filling vessel are of different types, such as syringe and bag, test tube and vial, syringe and vial, etc.

In one embodiment, said at least one correction coefficient comprises a coefficient for correcting the speed difference between calibration and operation. The calibration speed, i.e. the rotation speed of the pump when it is being calibrated, is usually different from the operating speed of the pump, i.e. the rotation speed of the pump when it is in operation. Said correction coefficient takes into account the speed difference between the pump rotating at calibration speed and rotating at operating speed. In a preferred embodiment, said speed correction coefficient is a ratio of a coefficient that is a function of the pump calibration speed and a coefficient that is a function of the pump operating speed.

Advantageously, the method for calibrating a peristaltic pump object of the present invention additionally includes a step of reusing the liquid injected into the calibration vessel by returning the liquid from the calibration vessel to the hydraulic circuit. In this way, the fluid used during the pump calibration process can be injected back into the hydraulic circuit and used in the corresponding production process. This feature makes it possible to avoid the loss of the fluid used in the pump calibration process, as occurs in the calibration processes known from the prior art. In this way, the economic loss associated with the loss of fluid is avoided, which is higher, the higher the cost of the fluid.

According to another aspect of the present invention, it is also disclosed a method for dispensing a determined quantity of liquid by means of a peristaltic pump, said pump being associated with a hydraulic circuit, which comprises the following steps:

calculating the volume per pumping cycle of the peristaltic pump at the operating speed thereof according to the calibration method described above, starting to dispense liquid by means of the peristaltic pump, counting the number of pumping cycles completed while dispensing is being carried out, determining the pumped volume on the basis of the volume per actual pumping cycle at the dispensing speed and the number of pumping cycles completed, halting the supply of liquid when the pumped volume determined in the previous point reaches a determined quantity of liquid.

In one embodiment, dispensing is carried out at constant pump speed, meaning that the rotation speed of the pump is constant during the dispensing of the liquid. In an alternative embodiment, dispensing is carried out at variable pump speed, i.e. the rotation speed of the pump is not constant during the dispensing of the liquid. Preferably, the pump speed during dispensing depends on the pressure in the hydraulic circuit downstream of the pump. More specifically, the pump speed can vary as a function of the pressure of the hydraulic circuit associated with same, with the aim of operating at the highest possible speed that ensures the circuit pressure does not exceed a certain limit. This is especially important when the hydraulic circuit contains filters and the like since, as they become clogged during their operation cycle, they increase the pressure loss of the hydraulic circuit.

Preferably, the method for dispensing a certain quantity of liquid that is the subject matter of the present invention also considers the dead volume of the hydraulic circuit.

According to the present invention, to determine the calibrated volume per pumping cycle, it is possible to use one, two or any combination of the correction coefficients described above. Said correction coefficients can also be combined with one another and/or with other coefficients by means of standard mathematical operations.

According to another aspect of the present invention, it is also disclosed a device for producing sterile preparations comprising a peristaltic pump and a control device of said peristaltic pump and said device, wherein said control device is configured to execute a method for calibrating said peristaltic pump according to a calibration method described above.

Although the dispensing method described above preferably supplies a determined volume of liquid, said method can also be used to supply a determined mass.

In one embodiment, the device for producing sterile preparations object of the present invention comprises at least a source vessel, a calibration vessel, a fluid distributor and a dispensing vessel, forming a hydraulic circuit together with the peristaltic pump. In a preferred embodiment, the calibration vessel is a variable-volume vessel with a plunger, for example, a syringe. Advantageously, said plunger is driven by automatic driving means, such as a robotic arm, etc.

In one advantageous embodiment, said control device is configured to execute a dispensing method as described above.

In one embodiment, the device for producing sterile preparations comprises means for measuring the liquid contained in the calibration vessel. Preferably, said measuring means measure the volume of the liquid contained in the calibration vessel. Alternatively or additionally, said measuring means measure the mass of the liquid contained in the calibration vessel.

In this document, the directions horizontal, vertical, up, down, etc. are understood to be according to the normal working position of the device for producing sterile preparations, i.e. with its longitudinal axis perpendicular to the ground.

BRIEF DESCRIPTION OF THE DRAWINGS

A series of drawings representing at least one embodiment of the method for calibrating a peristaltic pump, the method for dispensing liquid and the device for producing sterile preparations object of the present invention are appended to ensure better understanding through explanatory but not limiting examples.

In the figures, the same or equivalent elements have been identified with identical numerals.

DETAILED DESCRIPTION OF THE PREFERRED EMBODIMENTS

Figure 1:
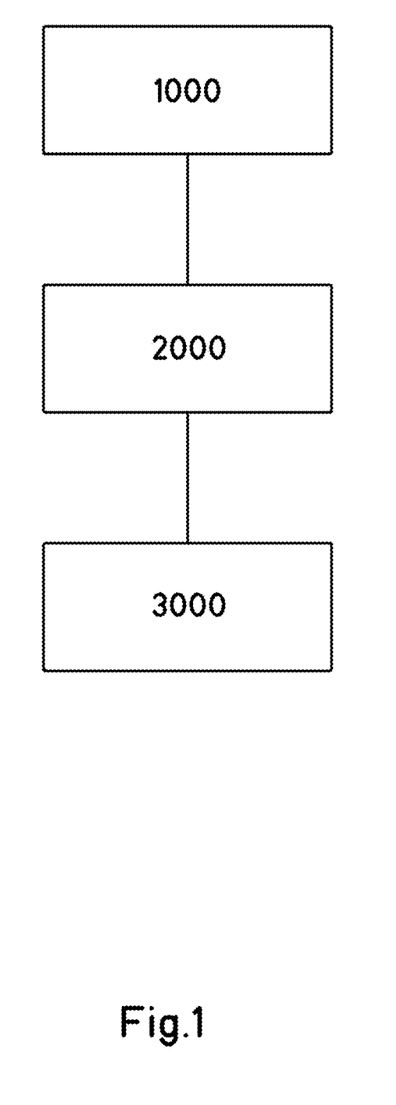
FIG. 1 is a flowchart of a first exemplary embodiment of a method for calibrating a peristaltic pump according to the present invention.

FIG. 1 shows a flowchart of a first exemplary embodiment of a method for calibrating a peristaltic pump according to the present invention. The first step 1000 of this first embodiment comprises pumping a quantity of liquid from a source vessel to a calibration vessel by means of a number of pumping cycles of the peristaltic pump.

The second step 2000 of this first exemplary embodiment comprises measuring the quantity of liquid pumped into the calibration vessel. Although in this first exemplary embodiment said measurement is by volume, i.e. measuring the volume of liquid contained in the calibration vessel, in other embodiments said measurement can also be by mass, i.e. measuring the mass of the fluid contained therein.

The third step 3000 of the first exemplary embodiment comprises determining the calibrated volume per pumping cycle of the peristaltic pump, i.e. determining the actual volume supplied by the pump for each pumping cycle thereof. In embodiments in which, in the second step 2000 the measurement is by mass, the parameter that is determined in the third step 3000 is the calibrated mass per pumping cycle of the peristaltic pump, i.e. the mass of fluid supplied by the pump for each pumping cycle of the pump.

Said calibrated volume, or mass, per pumping cycle is a function of the quantity of liquid measured in the second step 2000, of the number of pumping cycles completed in the first step 1000 for pumping said quantity of liquid, and of at least one correction coefficient previously stored in a memory of a control device of the peristaltic pump. Said at least one correction coefficient is described more clearly in FIG. 3 and can be determined by empirical tests and a corresponding statistical analysis thereof. It is important to mention that said empirical tests and the corresponding statistical analysis are performed prior to the calibration process, i.e. they are not determined during the pump calibration process, as is the case in the known prior art.

In this first exemplary embodiment, the pumping cycle is understood to be 1/n of a complete revolution of the rotor of the peristaltic pump, where n is an integer representing the number of rollers of the rotor of the pump. However, in other embodiments the pumping cycle can be a complete revolution of said rotor.

Figure 2:
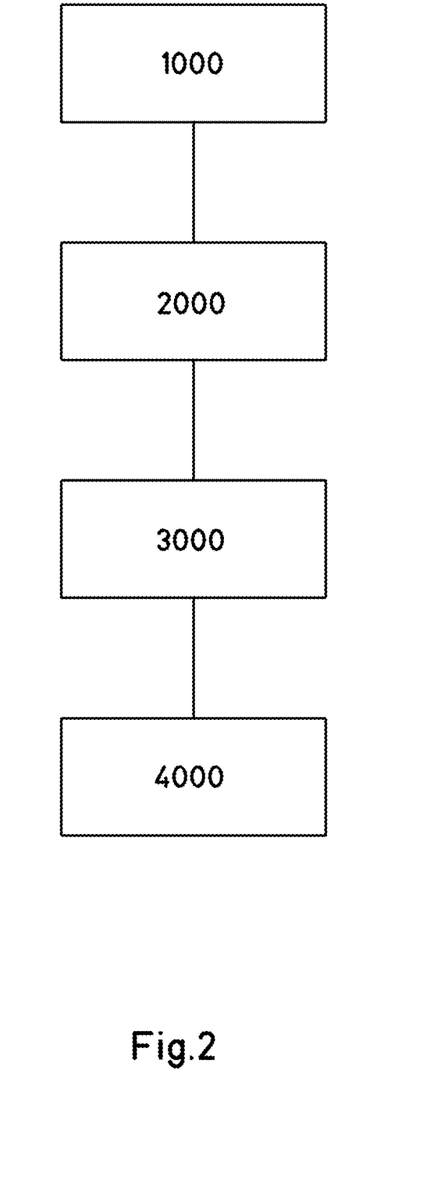
FIG. 2 is a flowchart of a second exemplary embodiment of a method for calibrating a peristaltic pump according to the present invention.

FIG. 2 shows a flowchart of a second exemplary embodiment of a method for calibrating a peristaltic pump according to the present invention. Said second embodiment is essentially like the first one described above, see FIG. 1, with the difference that it comprises a fourth step 4000 that includes returning the liquid contained in the calibration vessel after the completion of the third step 3000 to the hydraulic circuit associated with the peristaltic pump, thus making it possible to reuse the fluid used to calibrate the pump in the productive process, for example, filling bags or vials. This fourth step, although optional, has important economic advantages, especially when the working fluid is expensive, since it avoids wasting fluid during the calibration of the pump.

The calibration vessel is preferably a variable-volume vessel with a plunger, such as a syringe. In this type of embodiments, the fourth step 4000, if carried out, can be performed by pushing the plunger so that the fluid stored therein is forced out of it and back into the hydraulic circuit associated with the pump. Although the plunger can be driven manually, it is preferably driven by automatic operating means, such as a robotic arm, a piston, etc. In the case that the used pump is reversible, it is also possible to carry out the fourth step 4000 by reversing the direction of rotation of the pump, so that it sucks up the liquid contained in the calibration vessel.

Figure 3:
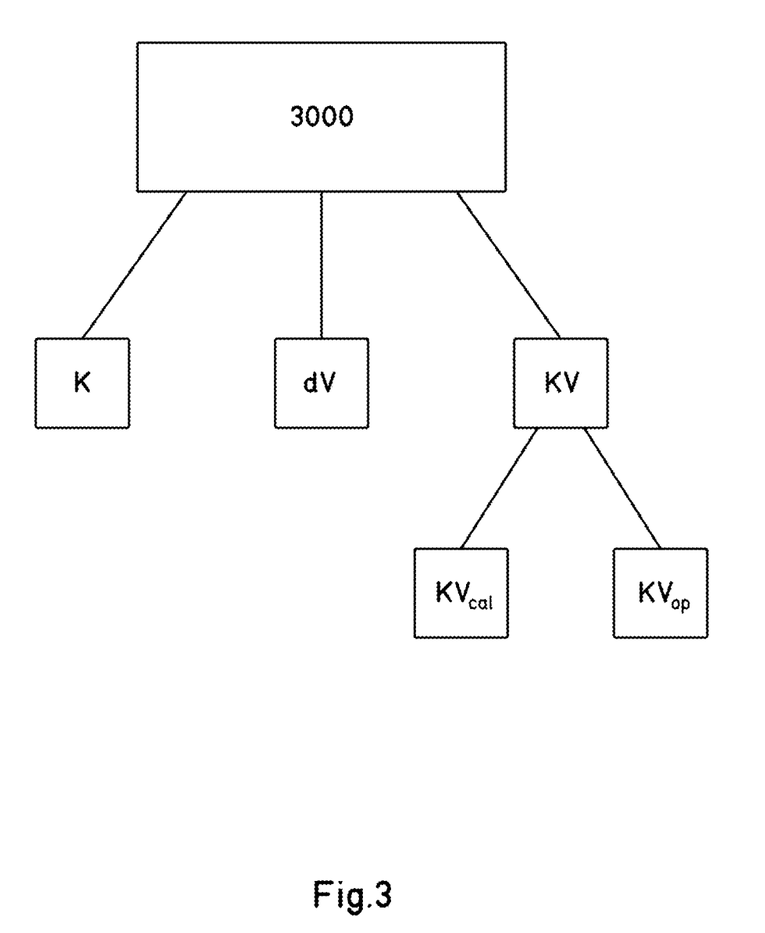
FIG. 3 is a flowchart of the calculation of the calibrated volume per pumping cycle of the peristaltic pump according to an exemplary embodiment of the present invention.

FIG. 3 shows a flowchart of the calculation of the calibrated volume per pumping cycle of the peristaltic pump according to the present invention. This figure shows three different correction coefficients k, dv, Kv that can be applied in the third step 3000 to determine the calibrated volume, or mass, per pumping cycle of the peristaltic pump.

The coefficient k can correct the filling resistance of the calibration vessel. Said coefficient k is especially important when the calibration vessel and the dispensing vessel are not the same. For example, when the calibration vessel is a syringe and the dispensing vessel, the vessel into which the final dosage is supplied, is a vial or a bag. In the case that the calibration vessel is, for example, a syringe, as the fluid fills it, it has to overcome the resistance exerted by the plunger and, if it has any, its automatic means of operation.

The coefficient dv corrects the possible expansion of the hydraulic circuit during calibration.

After numerous empirical tests and analyses of the results obtained, the applicant has determined that a particularly preferred calibration setting for similar pump speeds during calibration and operation according to the present invention can have the following form:

$$D = k \times \frac{N}{(SV + dv)}$$

where D is the dose, i.e. the volume or mass per pumping cycle of the pump, k is the coefficient for correcting the filling resistance, N is the number of pumping cycles, SV is the quantity of liquid measured in the calibration vessel and dv is the coefficient for correcting the possible expansion of the hydraulic circuit during the start of dispensing into the calibration vessel.

According to the present invention, a coefficient Kv can be used to correct the speed difference between pump calibration and operation. The first step 1000 of the calibration method of the present invention is usually carried out at a determined rotation speed of the pump. Said rotation speed during calibration, or simply, the calibration speed, is usually different from the rotation speed of the pump during the operation thereof, or simply, the operating speed.

Thus, the relationship between the volume to be dispensed at the operating speed and the speed correction coefficient Kv can be, for example, as follows:

$$N = Vol \times D \times Kv$$

where N is the number of pumping cycles, Vol is the volume to be dispensed, D is the dose per pumping cycle of the pump and Kv is the speed correction coefficient.

According to the present invention, the coefficient Kv can be expressed, preferably, as the ratio of two different correction coefficients, $K_{Vcal}$ and $K_{Vop}$. $K_{Vcal}$ refers to the pump calibration speed and $K_{Vop}$ refers to the pump operating speed. Consequently, the above equation can be expressed as follows:

$$N = Vol \times D \times \frac{Kv_{cal}}{Kv_{op}}$$

Figure 4:
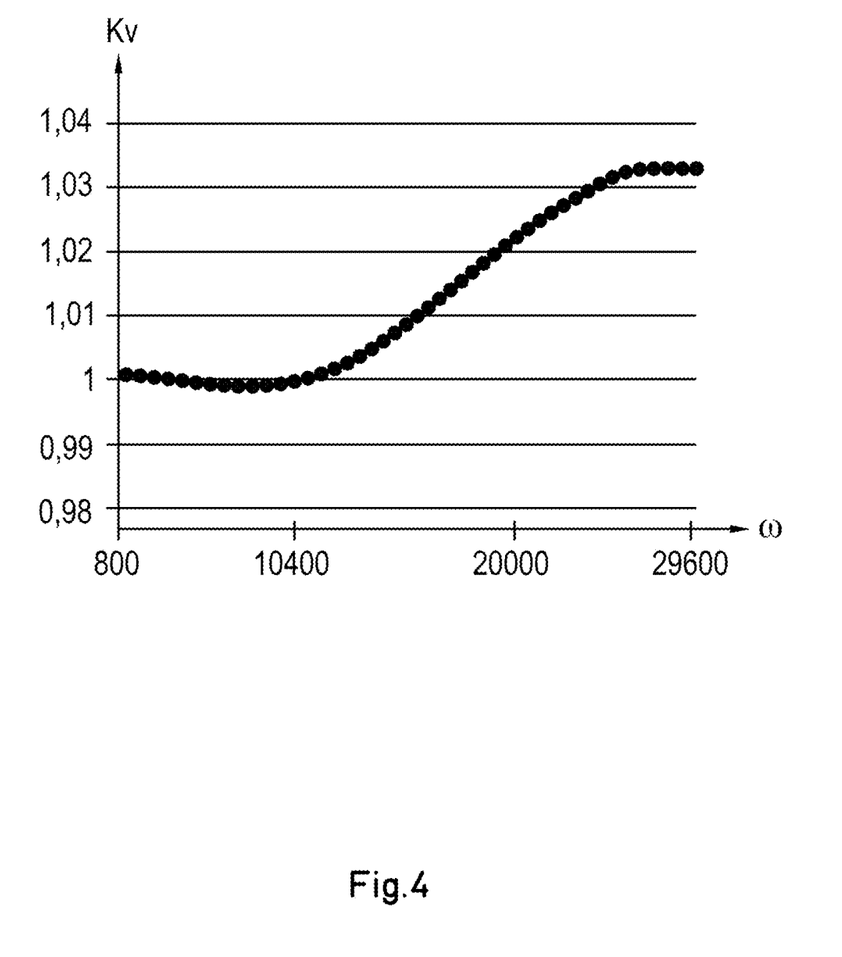
FIG. 4 is a graph showing the variation of the coefficient for correcting the speed difference between calibration and operation of an exemplary embodiment according to the present invention.

FIG. 4 shows in a graph the variation of the coefficient for correcting the speed difference between calibration and operation of an exemplary embodiment according to the present invention. In this graph, the abscissa axis shows the dispensing speed ω of the peristaltic pump and the ordinate axis shows the value of the speed correction coefficient Kv. The dispensing speed ω is shown in counts per second of the rotary encoder. This graph is obtained empirically for each device and the values and/or equations obtained are stored as a table or as an equation in the memory of the control device of the device that is the subject matter of the present invention, ready to be used during operation. As can be seen, in the embodiment shown, the value of Kv initially drops slightly below 1, and then increases its value as the dispensing speed ω increases, until it reaches a point where its value stabilises and practically does not vary even if the dispensing speed ω continues to increase.

In the graph of FIG. 4, Kv is defined as follows:

$$Kv = \frac{Kv_{cal}}{Kv_{op}}$$

Figure 5:
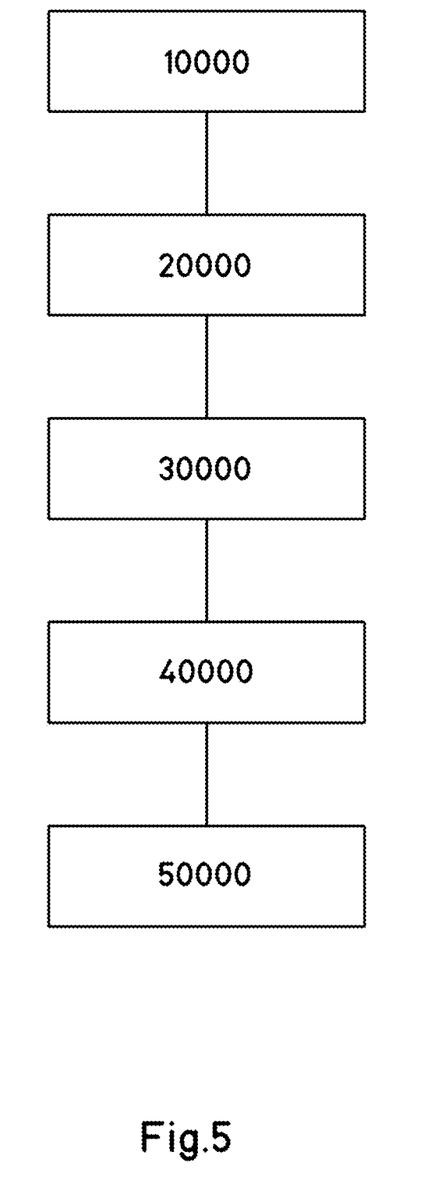
FIG. 5 is a flowchart of an exemplary embodiment of a method for dispensing a quantity of liquid according to the present invention.

FIG. 5 shows a flowchart of an exemplary embodiment of a method for dispensing a determined quantity of liquid by means of a peristaltic pump according to the present invention. The first step 10000 of this embodiment comprises calculating the volume, or mass, per pumping cycle of the peristaltic pump at the operating speed thereof according to the calibration method described above. The second step 20000 comprises the start of dispensing liquid by the peristaltic pump. The third step 30000 includes counting the number of pumping cycles completed while the fluid is being dispensed, i.e. while the second step 20000 is being carried out. According to the foregoing, the second 20000 and third 30000 steps of the dispensing method of the present invention are preferably carried out simultaneously. The fourth step 40000 comprises determining the pumped volume by volume, or mass, per actual pumping cycle at dispensing speed and the number of pumping cycles completed. The fifth step 50000 includes halting the supply of liquid when the volume determined in the fourth step 40000 reaches a determined quantity of liquid, said quantity being the quantity to be dispensed.

In embodiments in which the rotor of the pump is associated with a rotary encoder that measures the angular position thereof, the continuous calculation of the volume supplied by the pump according to the present invention can be expressed by the following equation:

$$DispVol \mathrel{+}= \frac{CountIncr}{Enc \times D} \times Kv$$

where DispVol is the accumulated volume supplied, CountIncr is the increment of rotary encoder counts, Enc is the number of rotary encoder counts for each pumping cycle of the pump and Kv is the speed correction coefficient. The += operator is the addition assignment operator used in various computer programming languages, such as C#.

As explained above, the above equation can also be expressed as:

$$DispVol \mathrel{+}= \frac{CountIncr}{Enc \times D} \times \frac{Kv_{op}}{Kv_{cal}}$$

The condition for halting the supply of fluid by means of the pump according to the present invention can be expressed as:

$$DispVol \geq (Vol+SyrOffset)$$

where DispVol is the accumulated volume supplied, Vol is the volume to be supplied or set volume, and SyrOffset is a dead volume that is retained in the hydraulic circuit, especially in the case that said circuit has a filter. A typical value of SyrOffset can be, for example, 1.2 ml.

Before starting the dispensing process of the first step 10000 it is possible, according to the present invention, to perform an approximate calculation of the number of pumping cycles that will be necessary in order to supply the required volume Vol. This calculation can be made using the following equation:

$$N=(Vol+SyrOffset) \times D$$

where N is the number of pumping cycles, Vol is the volume to be dispensed, SyrOffset is the dead volume that is retained in the hydraulic circuit and D is the dose per pumping cycle of the pump.

Although the correction coefficients k, dv and Kv are used in the embodiment shown, only one, a selection of two or any combination thereof may be used in other embodiments of the present invention. Said correction coefficients can also be combined with one another and/or with other coefficients by means of standard mathematical operations.

Figure 6:
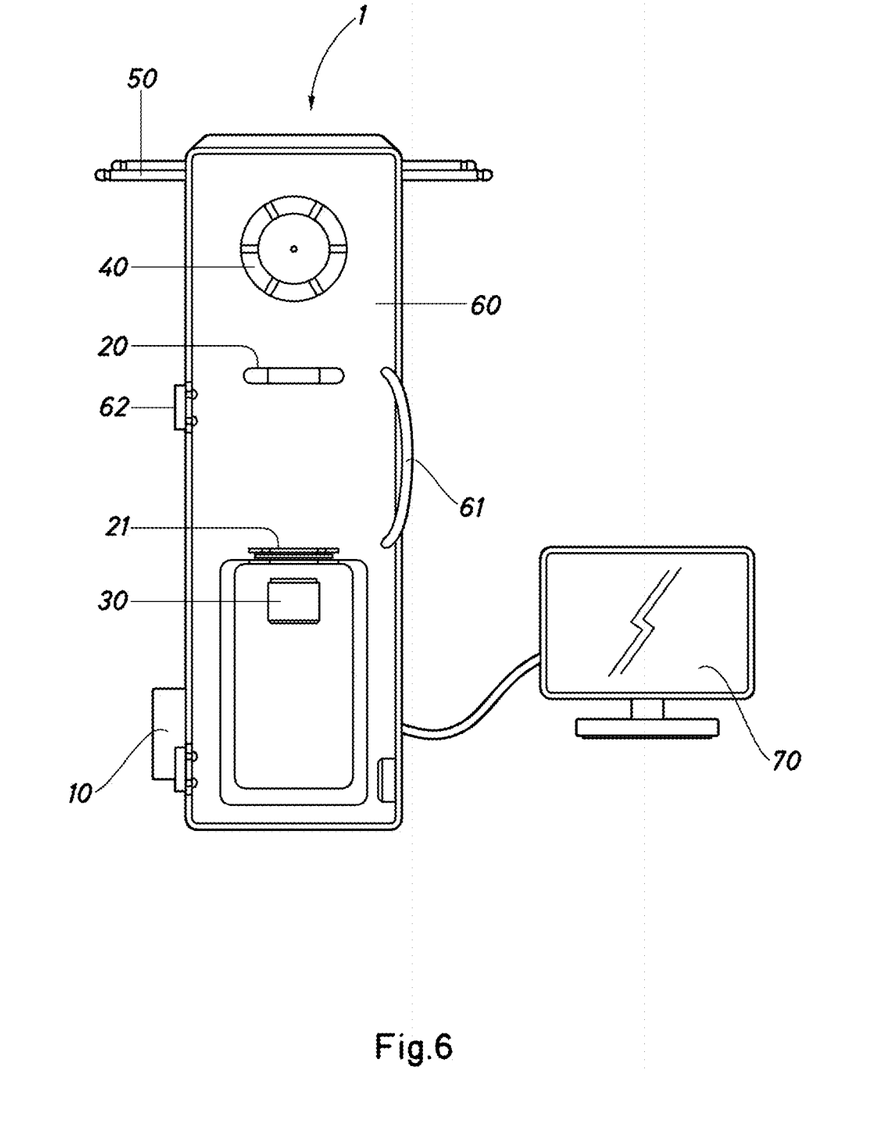
FIG. 6 is a front elevation view of an exemplary embodiment of a device for producing sterile preparations according to the present invention.
Figure 7:
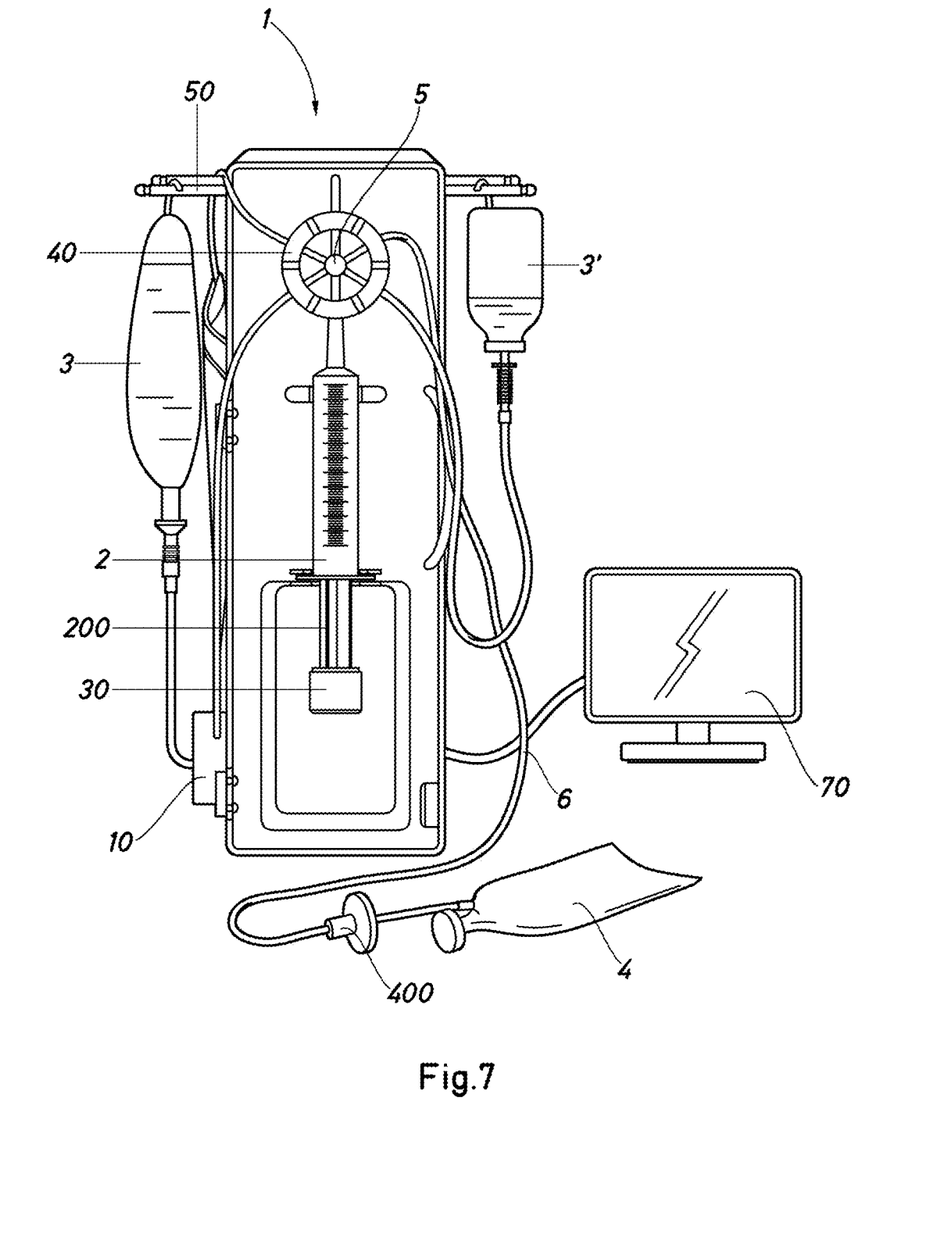
FIG. 7 is a front elevation view of the device of FIG. 6 with an example of a disposable kit for producing sterile preparations.

FIG. 6 and FIG. 7 show, in front elevation view, an exemplary embodiment of a device for producing sterile preparations according to the present invention. FIG. 6 shows the device 1 for producing sterile preparations without mounting any disposable kit for producing sterile preparations, while in FIG. 7 the device 1 is provided with a disposable kit for producing sterile preparations. In the exemplary embodiment shown, the device 1 includes a peristaltic pump 10 in the lower portion of one of its sides. Said peristaltic pump can be seen in greater detail in FIG. 8.

The device 1 comprises, in its upper part, a plurality of supports 50 for infusion bags. Although the shown exemplary embodiment comprises four supports 50 for infusion bags, the number of supports may be different in other embodiments. On the front, the device 1 can comprise a cover 60 which, among other functions, protects the elements housed inside same and, in addition, protects the user of the device 1 against possible splashes of the fluids used therein. Said cover 60 can be transparent, or at least translucent, to allow observation of the elements of the device 1 and any accessories that are placed behind it, while still fulfilling the protective functions described above. The cover 60 can be attached to the device 1 by hinges 62 and can comprise a pull knob 61 to facilitate its opening and closing by the user of the device 1.

At the top of its front face, the device 1 can include a support 40 for a fluid distributor 5. Said fluid distributor 5 is described in detail in European patent EP 1236644 A1. Although its use is preferred, said support 40 is optional. Under the support 40 and approximately at the middle of the front of the device 1, the device can comprise a support 20 for a calibration vessel. In the exemplary embodiment shown in the figures, said support 20 is complemented with an auxiliary support 21 for the calibration vessel. In this case, both are suitable for holding a syringe 2.

The embodiment shown in FIG. 6 and FIG. 7 is especially suitable for the use of a syringe 2 as a calibration vessel. Therefore, the shown device 1 comprises means 30 for driving the plunger 200 of the syringe 2. Said driving means 30 can have automatic operation and can be of different types; for example, they can be a robotic arm, a piston, a nut integral with a spindle driven by an electric motor as described in EP 1236644 A1, etc. The driving means 30 can comprise a load cell, not shown, which can convert the force exerted on the plunger 200 into an electrical signal that can be processed in a device control device, not shown, and which will be taken into account by said control device in order to drive the means 30 for driving the plunger 200. Said load cell can also serve to infer the weight of the fluid contained in the syringe 2. The driving means 30 can also include sensors for determining the position of the plunger 200 and thus be able to determine the fluid contained in the syringe 2.

In this exemplary embodiment, the user of the device 1 enters the commands for its operation via the touchscreen 70. Said touchscreen 70 can also display status information for the device 1. Said screen 70 can be replaced, among others, by a keyboard or keypad. It is also possible to connect the device 1 to a computer in a wired or wireless manner, in order to control the device 1 via a specific computer program installed therein.

FIG. 7 shows how two source vessels 3, 3' containing fluids for producing sterile preparations hang from the supports 50. These vessels 3, 3' are connected to the distributor 5 via flexible pipes 6, and said distributor 5 is connected in turn to the syringe 2 and to the bag 4 that acts as a final vessel, i.e. as the vessel in which the sterile preparation prepared by the device is stored 1. The example of a bag 4 shown comprises a filter 400 as disclosed in Spanish utility model ES 1019546 U. The control device of the device 1, not shown, can be configured to perform a bubble point test as described, at least, in European patents EP 0624359 A1 and EP 1236644 A1.

The device 1 of the embodiment shown can fill the final vessel, in this case the bag 4, at constant or variable rotation speed of the pump 10. In the event of operating at variable speed, the rotation speed of the pump 10 can be the highest that allows the pressure inside the flexible ducts 6 to remain below a certain limit. This is especially important when filling bags 4 that comprise a filter 400, since said filter 400 can become clogged and increase the pressure loss that it introduces to the hydraulic circuit.

Figure 8:
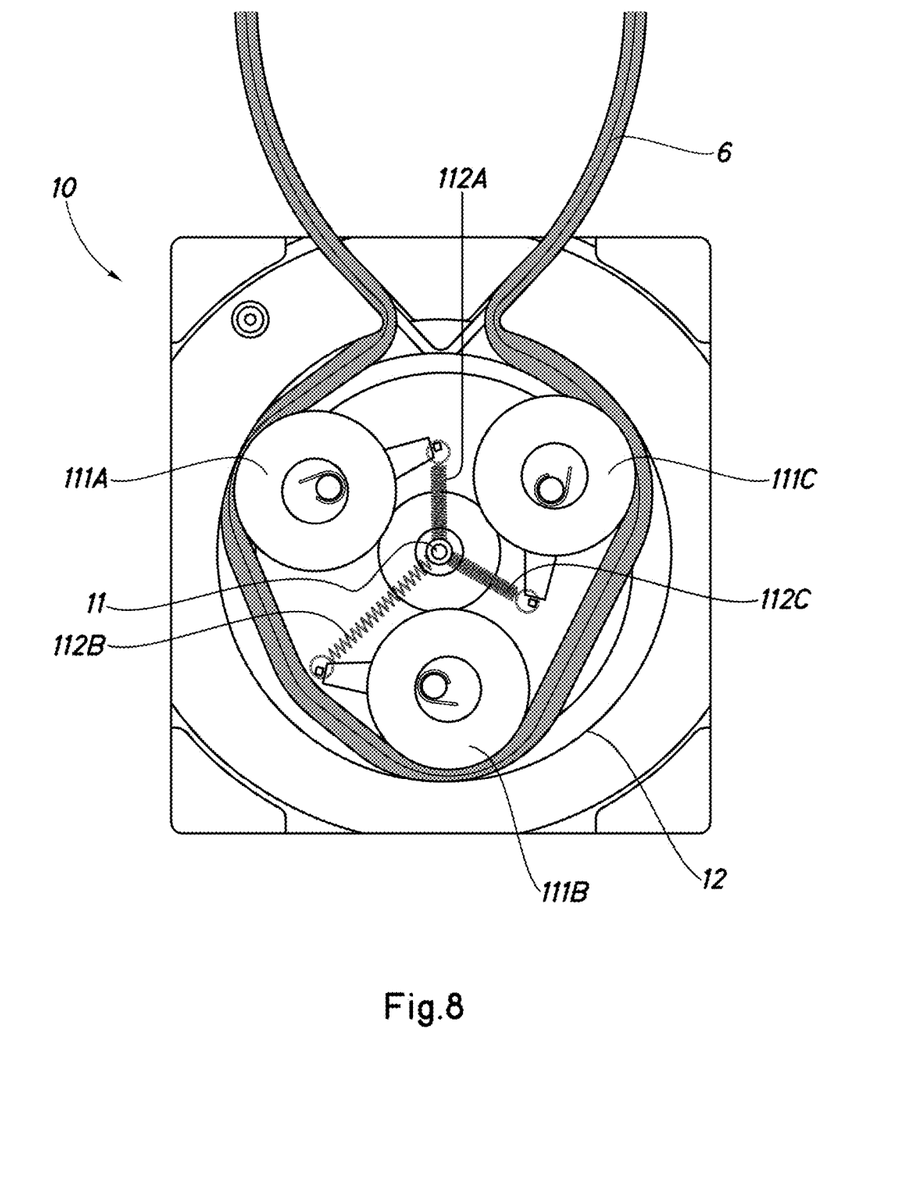
FIG. 8 is a cross-section view of the peristaltic pump of the device of FIG. 6 and FIG. 7.

FIG. 8 shows the peristaltic pump 10 of the device shown in FIG. 6 and FIG. 7. As can be seen, the peristaltic pump 10 of the shown exemplary embodiment comprises a rotor 11 with three rollers 111A, 111B, 111C responsible for compressing the flexible tube 6 against the circular casing 12. For this, the rollers 111A, 111B, 111C have respective springs 112A, 112B, 112C that act as resilient means. When the rotor 11 and its respective rollers 111A, 111B, 111C rotate, an effect known as peristalsis occurs, causing the fluid contained in the flexible tube 6 to move forward. The pump 10 can be reversible, i.e. capable of turning in the clockwise and anticlockwise directions.

Although in the shown example the rotor 11 of the peristaltic pump 10 comprises three rollers 111A, 111B, 111C, in other embodiments, the number of rollers may be different, for example 2, 4, 5, etc.

The following shows, by way of example, some values of the parameters described above for the embodiment shown in FIG. 6 to FIG. 8.

| Pumping cycle | ⅓ of a full revolution of the rotor |
|---|---|
| k | 1.00547 |
| dv | 0.65469 ml |
| $K_{Vcal}$ | 0.998664574 |

-continued

| Pumping cycle | ⅓ of a full revolution of the rotor |
|---|---|
| $K_{Vop}$ | 1.02313852 |
| Enc | 2882 |
| SyrOffset | 1.2 ml | k and dv have been determined empirically using a device 1 as shown in FIG. 6 to FIG. 8, in order to then be stored in the memory of the control device of said device 1. The shown value of $K_{Vcal}$ corresponds to a rotation speed of the peristaltic pump 10 of 6,400 rotary encoder counts per second. The shown value of $K_{Vop}$ corresponds to a rotation speed of the peristaltic pump 10 of 40,000 rotary encoder counts per second. The values of $K_{Vcal}$ and $K_{Vop}$ for different speeds were calculated empirically beforehand and stored in the memory of the device control device 1 and are selected according to the actual calibration and operation conditions, respectively. If the operation is carried out at variable speed, i.e. if the rotation speed of the pump varies during the operation, the calculations are carried out again by selecting the value of $K_{Vop}$ appropriate to the speed. The value of Enc depends on the structural features of the rotary encoder associated with the pump and the rotor thereof.

Although the device 1 shown above is configured for use in the production of sterile preparations, said device can also be used for producing non-sterile preparations. The device is specially configured to work, among others, with fluids derived from the blood, i.e. blood products, drugs and other types of products for medical and/or pharmaceutical use. However, it can also be used for producing other types of sterile preparations.

Although the invention was presented and described in reference to its embodiments, it is understood that these have no limiting effect on the invention, so that multiple structural details or others that may be obvious for a person skilled in the art may vary after interpreting the subject matter that is disclosed in the present description, claims and drawings. In particular, in principle and unless explicitly stated otherwise, all the features of each of the different embodiments and alternatives shown and/or suggested can be combined with one another. Therefore, all the variants and equivalents will fall within the scope of the present invention if they can be considered to be comprised in the broader scope of the following claims.

The invention claimed is:

1. Method for calibrating a peristaltic pump in order to determine a calibrated volume per pumping cycle of said peristaltic pump, said peristaltic pump forming a portion of a hydraulic circuit, comprising the following steps:
pumping a quantity of liquid from a source vessel into a calibration vessel by a plurality of pumping cycles of the peristaltic pump;
measuring the quantity of liquid pumped into the calibration vessel;
counting a number of pumping cycles completed while dispensing is being carried out;
determining the calibrated volume per pumping cycle of the peristaltic pump, said calibrated volume per pumping cycle being a function of the measured quantity of liquid, said number of pumping cycles and two or more correction coefficients previously stored in a memory of a control device of said peristaltic pump, said two or more correction coefficients being selected from the group consisting of two or more of: a coefficient for correcting for filling resistance of the calibration vessel; an empirically derived coefficient for correcting for expansion of at least the peristaltic pump of the hydraulic circuit during calibration, a coefficient for correcting a speed difference between calibration and operation, a coefficient for correcting for dead volume of the hydraulic circuit;
adjusting operation of the peristaltic pump based on the calibrated volume per pumping cycle.

2. Method according to claim 1, wherein the calibration vessel is a variable-volume vessel with a plunger.

3. Method according to claim 1, further comprising performing empirical tests and corresponding statistical analysis of the empirical tests to determine said two or more correction coefficients.

4. Method according to claim 1, wherein said at least one correction coefficient comprises the coefficient for correcting expansion of the hydraulic circuit during calibration determined according to the formula:

$$N=(SV+dv)\times(D/k)$$

wherein D is the volume or mass per pumping cycle of the pump, k is the coefficient for correcting the filling resistance, N is the number of pumping cycles, SV is the quantity of liquid measured in the calibration vessel and dv is the coefficient for correcting expansion of the hydraulic circuit during the start of dispensing into the calibration vessel.

5. A method for calibrating a peristaltic pump in order to determine a calibrated volume per pumping cycle of said peristaltic pump, said peristaltic pump forming a portion of a hydraulic circuit, comprising the following steps:
pumping a quantity of liquid from a source vessel into a calibration vessel by a plurality of pumping cycles of the peristaltic pump;
measuring the quantity of liquid pumped into the calibration vessel;
counting a number of pumping cycles completed while dispensing is being carried out;
determining the calibrated volume per pumping cycle of the peristaltic pump, said calibrated volume per pumping cycle being a function of a measured quantity of liquid, said number of pumping cycles and two or more correction coefficients previously stored in a memory of a control device of said peristaltic pump, wherein at least one of the two or more correction coefficients is selected from the group consisting of: an empirically derived coefficient for correcting for expansion of at least the peristaltic pump of the hydraulic circuit during calibration, a coefficient for correcting a speed difference between calibration and operation, a coefficient for correcting for dead volume of the hydraulic circuit; and
wherein one of the at least two correction coefficients comprises the coefficient for correcting filling resistance of the calibration vessel determined according to the formula:

$$N=(SV+dv)\times(D/k)$$

wherein D is the volume or mass per pumping cycle of the pump, k is the coefficient for correcting the filling resistance, N is the number of pumping cycles, SV is the quantity of liquid measured in the calibration vessel and dv is the coefficient for filling resistance of the calibration vessel; and adjusting operation of the peristaltic pump based on the calibrated volume per pumping cycle.

6. Method according to claim 3, wherein said two or more correction coefficients comprise the coefficient for correcting a speed difference between pump calibration speed and pump operating speed.

7. Method according to claim 6, wherein the speed correction coefficient is a ratio of a coefficient that is a function of the pump calibration speed divided by a coefficient that is a function of the pump operating speed.

8. Method according to claim 1, further comprising a step of reusing liquid injected into the calibration vessel by returning the liquid from the calibration vessel to the hydraulic circuit, wherein the liquid remains throughout the hydraulic circuit to be pumped.

9. Method for dispensing a determined quantity of liquid by a peristaltic pump, said peristaltic pump being associated with a hydraulic circuit, the method comprising the following steps:
   calculating the volume per pumping cycle of the peristaltic pump at the operating speed thereof according to claim 6,
   starting to dispense liquid by the peristaltic pump,
   determining the pumped volume based on the volume per actual pumping cycle at the dispensing speed and the number of pumping cycles completed,
   halting the supply of liquid when the pumped volume determined in the previous point reaches a determined quantity of liquid.

10. Method according to claim 9, wherein dispensing is carried out at constant pump speed.

11. Method according to claim 9, wherein dispensing is carried out at variable pump speed.

12. Method according to claim 11, wherein the speed of the peristaltic pump during dispensing corrects for pressure in the hydraulic circuit downstream of the peristaltic pump.

13. Method according to claim 9, wherein the method further corrects for dead volume of the hydraulic circuit using an offset factor.

14. Device for producing sterile preparations comprising a peristaltic pump and a control device of said peristaltic pump and said device, wherein said control device is configured to perform a method for calibrating said peristaltic pump according claim 1.

15. Device according to claim 14, comprising at least a source vessel, a calibration vessel, a fluid distributor and a dispensing vessel, forming a hydraulic circuit together with the peristaltic pump.

16. Device according to claim 15, wherein the calibration vessel is a variable-volume vessel with a plunger.

17. Device according to claim 16, wherein said plunger is driven by an automatic driver.

18. Device according to claim 14, wherein said control device is configured to execute a dispensing method comprising the following steps:
   calculating the volume per pumping cycle of the peristaltic pump at the operating speed thereof, wherein said two or more correction coefficients comprise a coefficient for correcting a speed difference between calibration and operation;
   starting to dispense liquid by the peristaltic pump;
   determining the pumped volume based on the volume per actual pumping cycle at the dispensing speed and the number of pumping cycles completed;
   halting the supply of liquid when the pumped volume determined in the previous point reaches a determined quantity of liquid.

19. Method according to claim 1, wherein said two or more correction coefficients comprise the coefficient for correcting a speed difference between calibration and operation, wherein the method comprises performing empirical tests and corresponding statistical analysis of the empirical tests to determine said coefficient for correcting a speed difference.

20. A method for calibrating a peristaltic pump in order to determine a calibrated volume per pumping cycle of said peristaltic pump, said peristaltic pump being associated with a hydraulic circuit, comprising the following steps:
   pumping a quantity of liquid from a source vessel into a calibration vessel by a plurality of pumping cycles of the peristaltic pump,
   measuring the quantity of liquid pumped into the calibration vessel,
   counting a number of pumping cycles completed while dispensing is being carried out;
   determining the calibrated volume per pumping cycle of the peristaltic pump, said calibrated volume per pumping cycle being a function of the measured quantity of liquid, said number of pumping cycles and at least one correction coefficient previously stored in a memory of a control device of said peristaltic pump by correcting for filling resistance, speed and dead volume retained in the hydraulic circuit;
   adjusting operation of the peristaltic pump based on the calibrated volume per pumping cycle;
   wherein the pump is calibrated to correct for filling resistance according to the formula:

$$N = (SV + dv) \times \frac{D}{k}$$

wherein D is the volume or mass per pumping cycle of the pump, k is the coefficient for correcting the filling resistance, N is the number of pumping cycles, SV is the quantity of liquid measured in the calibration vessel and dv is the coefficient for correcting expansion of the hydraulic circuit during the start of dispensing into the calibration vessel; and
   wherein the pump is calibrated to correct for speed according to the formula:

$$N = Vol \times D \times \frac{Kv_{cal}}{Kv_{op}}$$

wherein N is the number of pumping cycles, Vol is the volume to be dispensed, D is the volume or mass per pumping cycle of the pump, $K_{V_{cal}}$ refers to the pump calibration speed and $K_{V_{op}}$ refers to the pump operating speed; and
   wherein the pump is calibrated to correct for dead volume in the hydraulic circuit according to the formula:

$$N = (Vol + SyrOffset) \times D$$

where N is the number of pumping cycles, Vol is the volume to be dispensed, SyrOffset is the dead volume that is retained in the hydraulic circuit, and D is the dose per pumping cycle of the pump.

21. A method for calibrating a peristaltic pump in order to determine a calibrated volume per pumping cycle of said peristaltic pump, said peristaltic pump forming a portion of a hydraulic circuit, comprising the following steps:

pumping a quantity of liquid from a source vessel into a calibration vessel by a plurality of pumping cycles of the peristaltic pump;

measuring the quantity of liquid pumped into the calibration vessel, wherein the liquid remains throughout the hydraulic circuit to be pumped;

counting a number of pumping cycles completed while dispensing is being carried out;

determining the calibrated volume per pumping cycle of the peristaltic pump, said calibrated volume per pumping cycle being a function of the measured quantity of liquid, said number of pumping cycles and correction coefficients previously stored in a memory of a control device of said peristaltic pump, said correction coefficients comprising:

a coefficient for correcting for filling resistance of the calibration vessel and one of:

an empirically derived coefficient for expansion of at least the peristaltic pump of the hydraulic circuit during calibration, a coefficient for correcting a speed difference between calibration and operation, or a coefficient for correcting for dead volume of the hydraulic circuit;

adjusting operation of the peristaltic pump based on the calibrated volume per pumping cycle.

22. The method for calibrating a peristaltic pump according to claim 21, wherein said coefficients for correcting comprise the coefficient for correcting for filling resistance of the calibration vessel and the coefficient for expansion of the hydraulic circuit during calibration.

23. Method according to claim 1, further comprising reusing liquid injected into the calibration vessel by returning the liquid from the calibration vessel to the hydraulic circuit.

24. The method according to claim 1, wherein measuring the quantity of liquid pumped into the calibration vessel comprises the step of weighing the quantity of liquid in the calibration vessel.

25. The method according to claim 5, wherein measuring the quantity of liquid pumped into the calibration vessel comprises the step of weighing the quantity of liquid in the calibration vessel.

* * * * *